US008803807B2

(12) United States Patent  
Abrams et al.

(10) Patent No.: US 8,803,807 B2  
(45) Date of Patent: Aug. 12, 2014

(54) KEYBOARD WITH THUMB OPERATED SPACEBAR CURSER CONTROLLER

(76) Inventors: Clem Abrams, LaJolla, CA (US); Richard A. Dean, LaJolla, CA (US); Matin Dinca, San Diego, CA (US); Tharold E. Northup, San Diego, CA (US)

(*) Notice: Subject to any disclaimer, the term of this patent is extended or adjusted under 35 U.S.C. 154(b) by 148 days.

(21) Appl. No.: 13/507,667

(22) Filed: Jul. 18, 2012

(65) Prior Publication Data

US 2013/0076623 A1    Mar. 28, 2013

Related U.S. Application Data

(63) Continuation-in-part of application No. 12/392,919, filed on Feb. 25, 2009, now abandoned.

(51) Int. Cl.  
*G06F 3/02* (2006.01)

(52) U.S. Cl.  
USPC .......................................................... 345/168

(58) Field of Classification Search  
None  
See application file for complete search history.

(56) References Cited

U.S. PATENT DOCUMENTS

2012/0242578 A1*   9/2012   Laubach ...................... 345/160  
2012/0256839 A1*  10/2012   Suggs ........................... 345/168

* cited by examiner

*Primary Examiner* — Adam R Giesy  
(74) *Attorney, Agent, or Firm* — John R. Ross; John R. Ross, III

(57) ABSTRACT

A keyboard with a thumb-controlled curser. In a preferred embodiment a circular aperture about one centimeter in diameter is provided in the spacebar of the keyboard. A keyboard user controls the position of the computer curser by moving a portion of his thumb across the port. A light source illuminates an exposed surface of the user's thumb as it moves across the port. Light patterns reflected from the user's thumb are focused on a sensor. The output from the sensor is transmitted to the computer processor where the thumb movements monitored by the sensor are turned into control signals for controlling the position of the curser on a computer monitor.

10 Claims, 6 Drawing Sheets

FIG. 1  Minnow in Keyboard
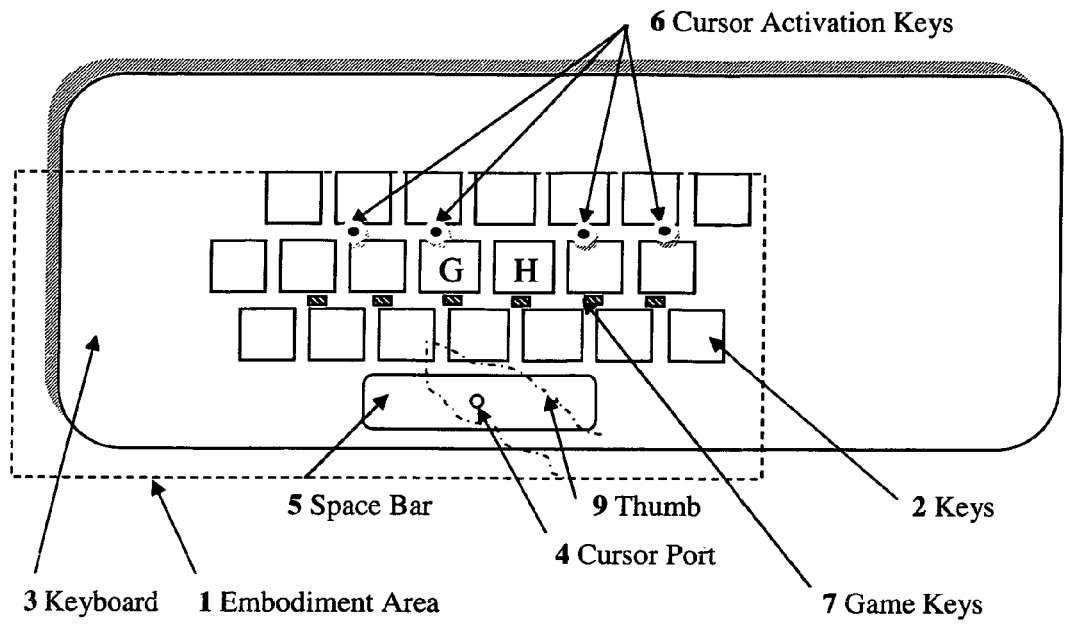
FIG. 2  Key Minnow Features
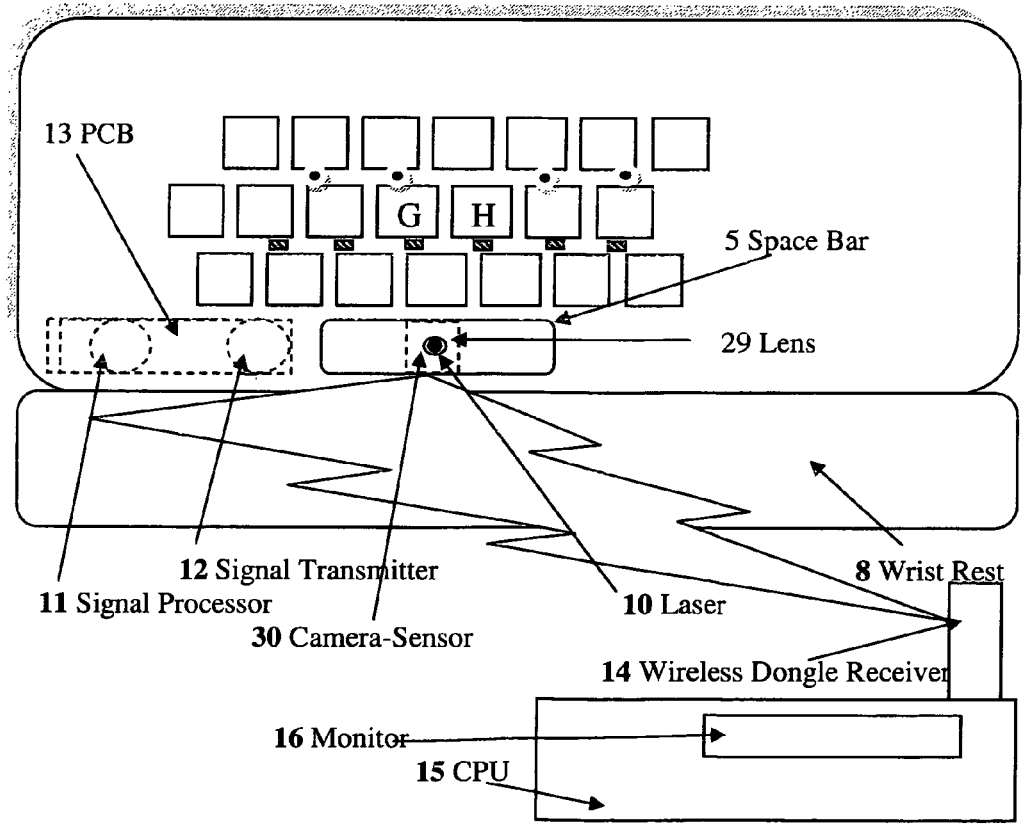

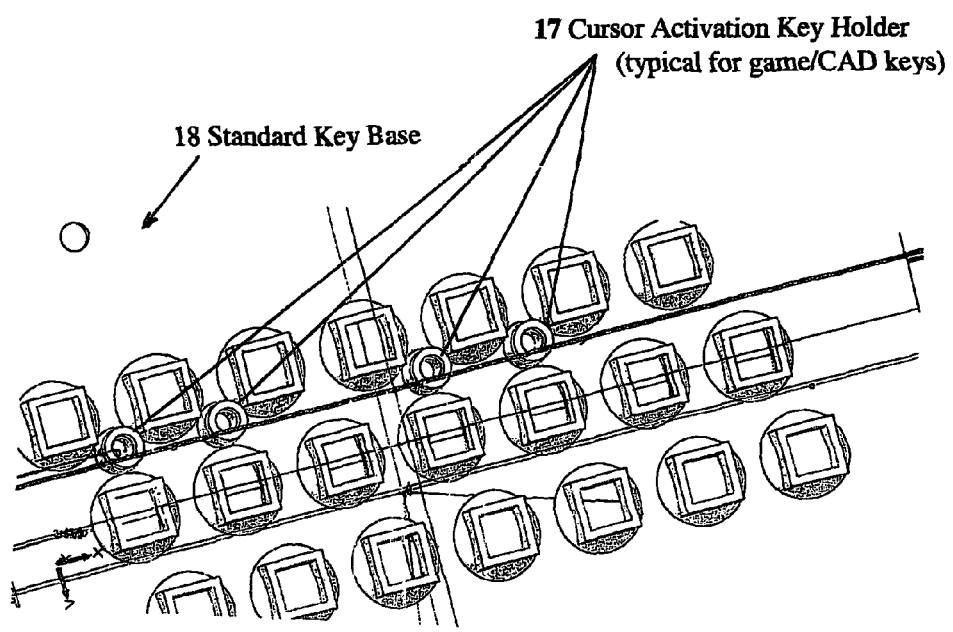
FIG. 3 Keyboard Key Base with Typical Cursor Activation Key Holders Added
17 Cursor Activation Key Holder (typical for game/CAD keys)
18 Standard Key Base

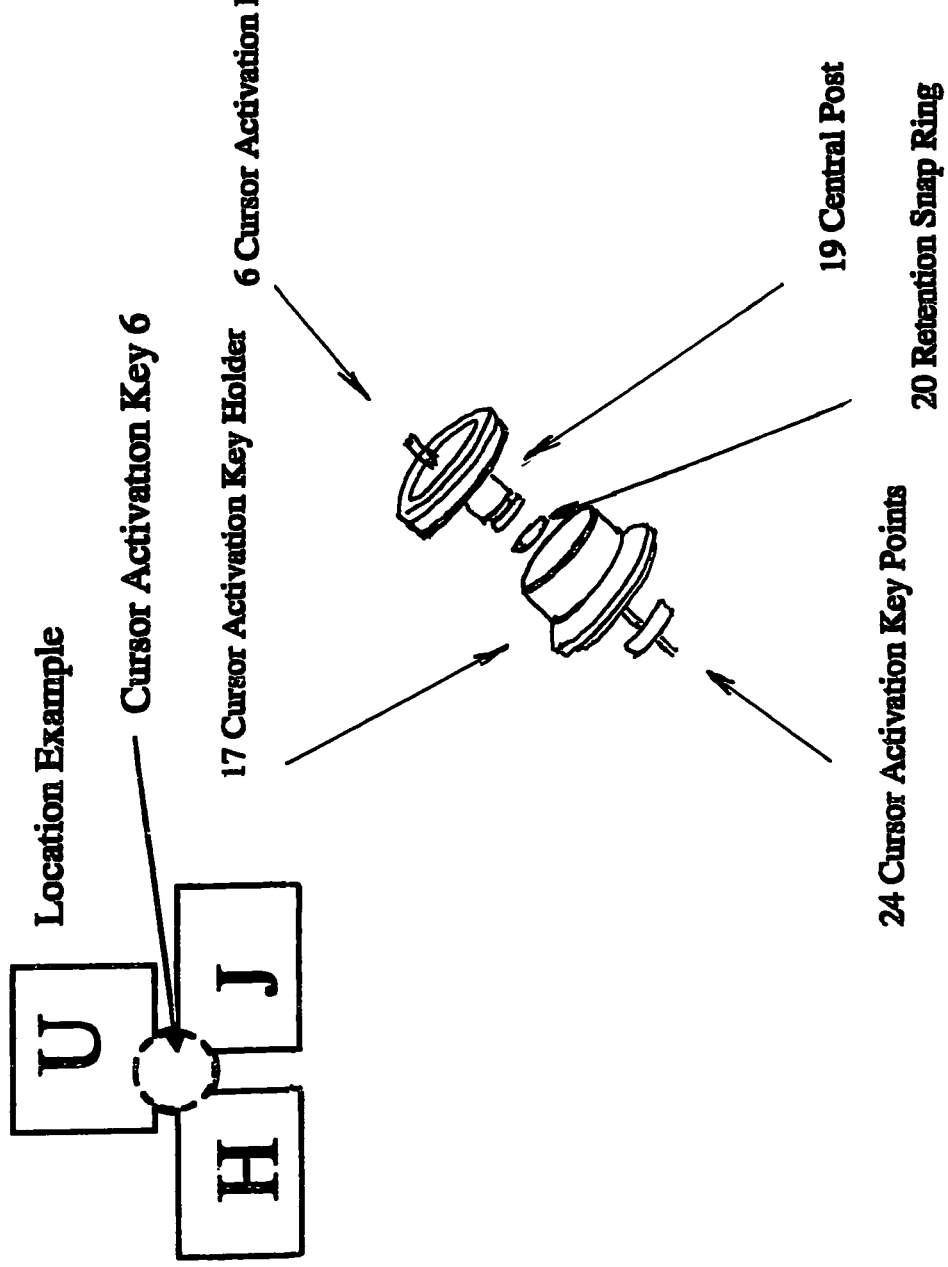

FIG. 5 Printed Circuit and Modifications
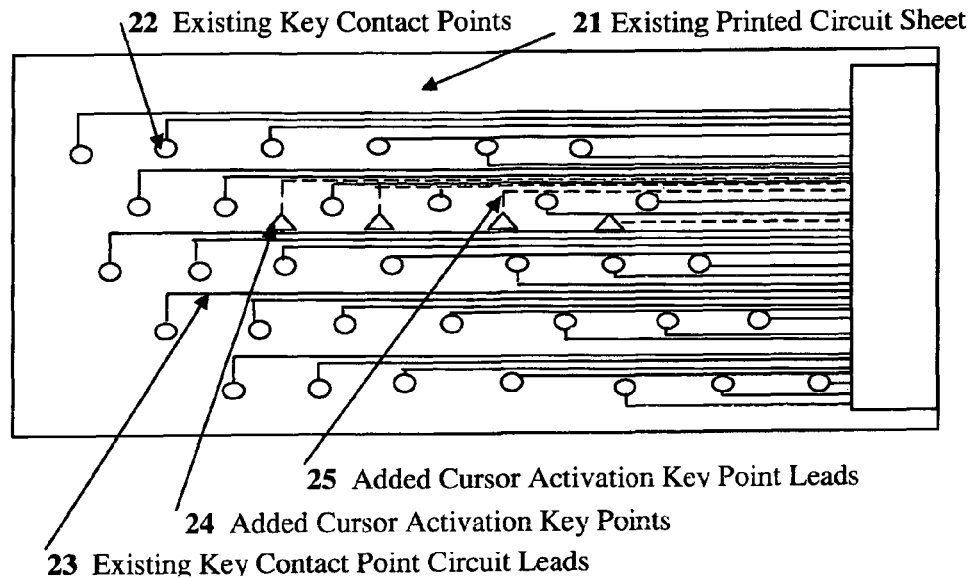
22 Existing Key Contact Points  
21 Existing Printed Circuit Sheet  
25 Added Cursor Activation Key Point Leads  
24 Added Cursor Activation Key Points  
23 Existing Key Contact Point Circuit Leads
FIG. 6 Key Return Mat
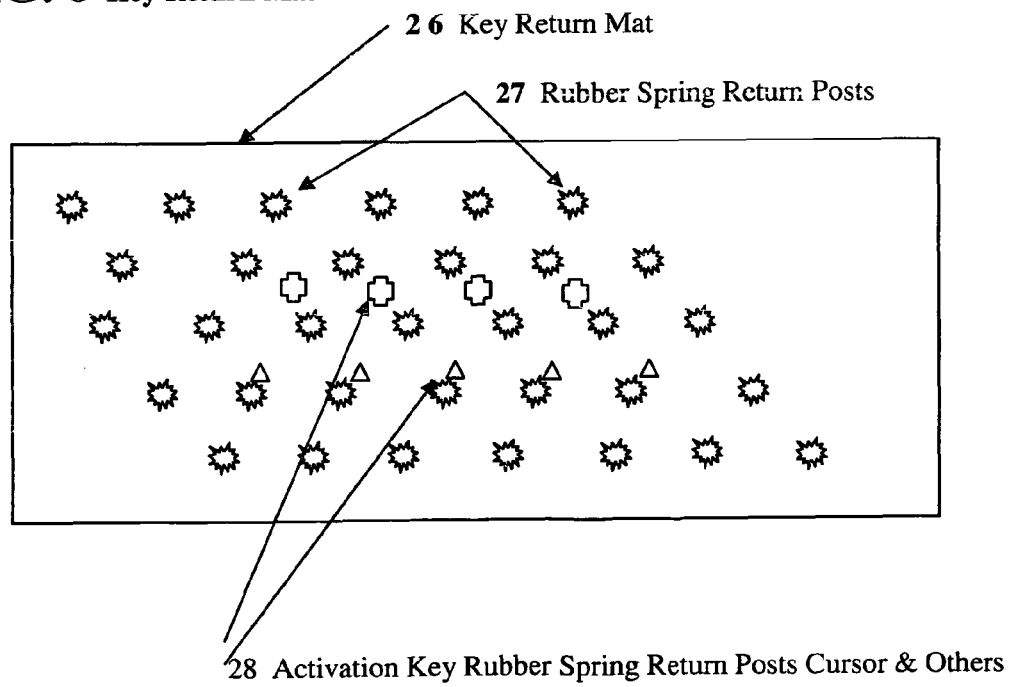
26 Key Return Mat  
27 Rubber Spring Return Posts  
28 Activation Key Rubber Spring Return Posts Cursor & Others FIG. 7 Preferred Embodiment Space Bar Configuration
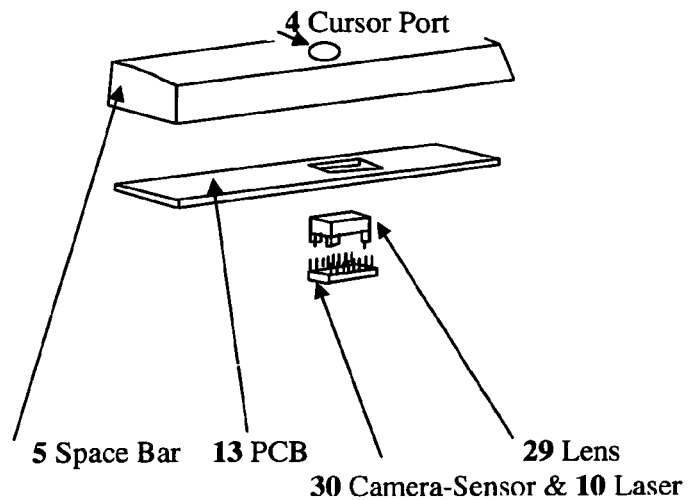
4 Cursor Port
5 Space Bar   13 PCB   29 Lens
30 Camera-Sensor & 10 Laser
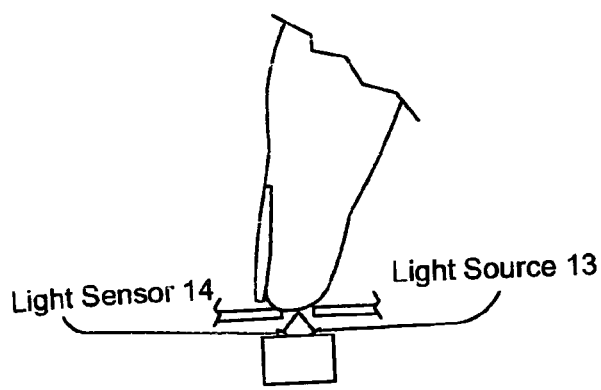
Light Sensor 14   Light Source 13
FIG. 9A
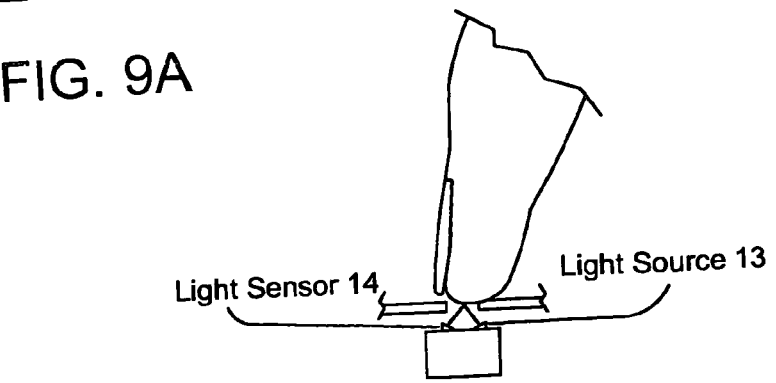
Light Sensor 14   Light Source 13
FIG. 9B

KEYBOARD WITH THUMB OPERATED SPACEBAR CURSER CONTROLLER

CROSS REFERENCE TO RELATED APPLICATIONS

The present invention is a continuation in part of Ser. No. 12/392,919 filed Feb. 25, 2009 now abandoned.

FIELD OF THE INVENTION

The present invention relates to computer keyboards and in particular to curser control devices for such keyboards.

BACKGROUND OF THE INVENTION

The efficiency of the interface between user and computer is diminished by the need to move at least one hand back and forth from the computer keyboard to the mouse, track-ball, or thumb keypad to make cursor control operations occur. While the laptop cursor pad, keyboard track ball, or wrist rest track-bar, allows the operator's hands to remain near the keys during cursor movement, their thumb or finger operation still takes fingers away from being directly over the keyboard. Another shortcoming of pad operation is the random triggering of cursor activation, a very aggravating event. A standard mouse and laptop keypad operation has become routine, even methodical, while consuming otherwise productive time due to hand movements back and forth.

There have been numerous efforts to break the ingrained use of the standard mouse, and to place similar operations closer to the operator's hands when directly over the keyboard. Instrumented gloves, finger held gadgets, reflective rings, palmed electronics, headgear, earrings, track-bar, foot-peddles, eyes, virtual grids, and forehead spots are some of the items showing up in various reports and patents, primarily targeted at handicapped operators, and coming at a prohibitive cost for the general user.

In general practice, few if any of these attempts have come to the general user market. Their marketability may be hindered by the difficulty of their use, or very high costs. To be successful, a replacement of the current mouse should be easier to operate, and equally or less costly.

The current optical mouse (not the first mouse), developed by Agilent Technologies was introduced to the world in late 1999. Basically, moving an optical mouse over a flat surface allows the x and y mouse movements to be transferred to the cursor on the computer monitor. The optical mouse actually uses a tiny camera to take thousands of pictures every second as the unit is moved over a flat surface. It is able to work on almost any surface, but usually over a mouse pad. Most optical mice use a small, light-emitting diode (LED) that reflects light off a surface onto a complimentary metal-oxide semiconductor (CMOS) sensor. In addition to LEDs, a recent innovation is a laser-based optical mouse that detects more surface details compared to LED technology. This results in the ability to use a laser-based optical mouse on even more surfaces than an LED mouse.

The sensor and other parts of an optical mouse work together:

The CMOS sensor sends each image to a digital signal processor (DSP) for analysis.
The DSP detects patterns in the images and examines how the patterns have moved since the previous image.
Based on the change in patterns over a sequence of images, the DSP determines how far the mouse has moved, and the direction, and sends the corresponding coordinates to the computer.
The computer moves the cursor on the screen based on the coordinates received from the DSP. This happens hundreds of times each second, making the cursor appear to move very smoothly.

An optical mouse reads surface patterns at a microscopic level through a lens, at a resolution of 400 digits per inch (dpi), or higher at a rate of about 1,500 times per second, or even faster. A good optical sensor should read above 800 dpi and for high accuracy and speed, up to 50,000 dpi can be employed. A laser may be substituted for the LED. The use of a laser is based on the same idea except it uses a narrow beam of light that is reflected off the surface producing an image with greater contrast that is captured by a higher resolution sensor (i.e. 1600 dpi) at a higher rate, of up to 6000-7000 times per second, and possibly more. Because of this advancement, laser can track where optical cannot, such as on clear glass. Experts believe the laser mouse will take over the optical mouse the same way that the optical mouse wiped out the ball-resister type mouse.

What is needed is an improved substitute for the current cursor control.

SUMMARY OF INVENTION

The present invention provides a keyboard with a thumb-controlled curser on the space bar, and cursor activation keys under the finger tips of the computer operator's hands. In a first preferred embodiment a circular aperture about one centimeter in diameter is provided in the spacebar of the keyboard. A keyboard user controls the position of the computer curser by moving a portion of his thumb across the port. A light source illuminates an exposed surface of the user's thumb as it moves across the port. Light patterns reflected from the user's thumb are focused on a sensor. The output from the sensor is transmitted to the computer processor where the thumb movements monitored by the sensor are turned into control signals for controlling the position of the curser on a computer monitor. The light source, the focusing lens and the sensor may all be components of a prior art off-the-shelf optical mouse. These components are merely reconfigured within the space bar to permit the curser to be controlled by the movement of the users thumb across the aperture in the spacebar rather than by the movement of the optical mouse across a mouse pad. No other cursor system, such as the standard mouse, track balls, track bars, thumb pads, etc., actually allow the operator's hands to remain directly over the keyboard keys.

In a preferred embodiment the light source, the lens and the sensor are all positioned within the spacebar. The user's thumb is illuminated by the laser. The reflections from the thumb are transmitted via the aperture, the same lens to the sensor. Several prototypes have been built and used with high efficiency over the past two years.

In other preferred embodiments (especially useful for very thin keyboards) the sensor and the light source are located outside the spacebar. In these embodiments include an optical conduit for transmitting light from the light source to the aperture in the spacebar and further includes an optical conduit for optically transmitting image-carrying light reflected from the thumb or finger to the sensor.

BRIEF DESCRIPTION OF THE DRAWINGS

FIG. 1 is a sketch of a computer key board modified with features of the present invention.

FIG. 2 is a sketch showing the key features of a preferred embodiment of the present invention in relation to other computer components.

FIG. 3 is a sketch of typical cursor activation key holders added to a standard key base.

FIG. 4 is a sketch of the cursor activation key of a preferred embodiment.

FIG. 5 is a sketch of a modified printed circuit sheet of a preferred embodiment.

FIG. 6 is sketch of the rubber key return mat of a preferred embodiment.

FIG. 7 is a sketch showing features of the first preferred embodiment.

FIGS. 9A and 9B are reproductions of FIGS. 23A and 23B of the parent application Ser. No. 12/392,919 filed Feb. 25, 2009

DETAILED DESCRIPTION OF PREFERRED EMBODIMENTS

Figure 8:
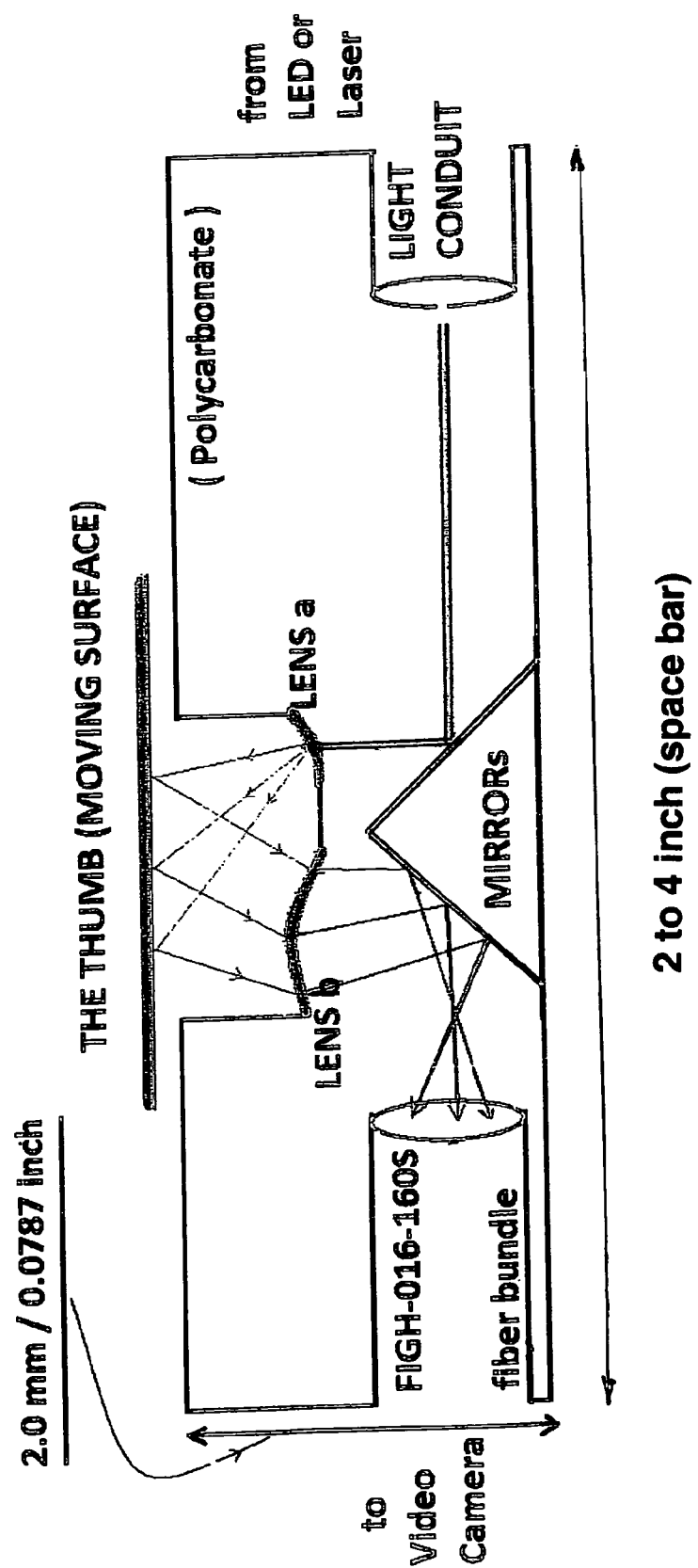
FIG. 8 is a drawing showing a preferred embodiment with the light source and sensor located outside the spacebar.

The present invention can be described by reference to FIGS. 1 through 9B. FIGS. 9A and 9B are reproductions of FIGS. 23A and 23B of the parent application referred to above showing a technique of controlling a curser with optical reflections from a user's finger or thumb.

FIG. 1 shows a portion of a standard keyboard modified in accordance with teachings of the present invention. Shown are four activation keys 6, five game keys 7, space bar 5 and curser port 4 which are included in some prior art keyboards to permit playing of computer games. According to concepts of the present invention, thumb 9 is used over the cursor port 4 in the space bar 5 to perform cursor operation using modified prior art keyboard optical/laser/RF technology. Activation keys 6 perform right, left, scroll, zoom, rotate, etc. cursor functions. Activation keys 6 and game keys 7 are optional and can be added or removed as needed.

The present invention provides an innovative application of existing optical mouse operation (including wireless) by reversing the conventional mouse position where it moves over the top of a mouse-pad, or table, to having the user's thumb 9 move over the stationary cursor port. More importantly, the computer operator's fingers and thumb remain directly over the normal keys and space bar and do not have to be removed at all to operate all cursor control functions. No other cursor operation system such as the normal mouse, track balls, thumb pad and others allow the hands to remain directly over the key board keys.

Concepts of the present invention have been demonstrated using some of the conventional mouse parts and miniaturized optical circuits. These proof of principles units showed that the electronic circuits can be miniaturized and located within the space bar 5 on a standard keyboard 3. Several prototype units of the first preferred embodiments have been produced and tested successfully. They have the added cursor activation 6 keys between the normal keys and have the lens-laser-sensor-cameral located within the space bar for easy thumb use. Test results confirm that the operators of the keyboard can be easily trained to use it and that the keyboard is easier to operate than a regular mouse. This new mouse concept avoids track ball jamming and random cursor activation while using a thumb pad on a laptop. The keyboard is very effective when used for computer games.

Applicants' first prototype mouse optics used an LED light source and a sensor with 400 dpi resolution. The movement of the cursor in the prototype was very manageable at this level.

The second prototype used a circuit with up to 1600 dpi resolution. Future units may have even lower or higher dpi resolution, even up to 50,000 dpi. This allows the size of the optics and the focal length to the moving surface to be minimized.

FIG. 2 shows the key features for the present invention and its relationship with other computer components. The keyboard 3 can be any board that has a space bar 5, or space for a cursor port 4. Keyboard 3 with attached wrist rest 8 works best with the wrist rest 8 providing stability to the hand for good thumb 9 control of operation. A printed circuit board, with added activation key spots is located inside the keyboard 3.

Placing both hands over the key board for normal operation, the right (or left for left hand operator), thumb is placed on the cursor port 4 and moved in the direction desired to move the cursor on the monitor. Cursor movement is accomplished by the thumb 9 moving in random or left-right-forward-backward movements. Thus, the cursor is moved around the monitor screen. When the required spot on the monitor is located, the fingers are used on the various activation keys 6, to pull down menus, select spots, scroll, rotate, zoom, or other actions that do not involve cursor movement. Reverse operation is provided for a left-handed operator. For game applications, similar operations are performed with game keys 7.

Preferred embodiment allows the operator to use his thumb 9 over the cursor port 4 to move the cursor. Either the right or left thumb is positioned over the cursor port 4, depending on right or left hand operation. The equivalent of the standard mouse micro switches for right, left, scroll, zoom and rotate are operated by using the operator's fingers on activation keys 6 located between the keyboard standard keys 2. Cursor movement, spot selection and activation allows both hands to remain directly above the keys 2 of the keyboard 3 for the most efficient operation of the computer.

Activation keys 6 are located between the rows of standard keyboard 3 keys 2. FIG. 3 shows the addition of the cursor activation key holders 17 to a standard keyboard 3. The cursor activation key holders 17 are formed into the existing keyboard 3 key base 18.

FIG. 4 shows the configuration of an activation key 6. It is configured to snap in and out of the cursor activation key holder 17. A central post 19 helps keep the cursor activation key 6 aligned with the cursor activation key holder 17. The retention snap ring 20 keeps the key 6 in the holder 17 until such time as the key 6 is snapped out. This feature allows a large number of special keys, including those for games, to be added to the keyboard 3 as needed, and removed when not needed. The activation key holder 17 length is easily adjusted for different height of standard desk top keyboard keys or those of a laptop.

FIG. 5 shows typical additions to the printed circuit sheet 21 for the activation keys 6. The existing key contact points 22 are used for normal key operation along with their key control point circuit leads 23. A separate circuit sheet can also be used specifically for all new keys. The addition of activation key points 24 along with their cursor activation point leads 25 brings the right, left, scroll, zoom, rotate, etc. functions to an existing printed circuit sheet 21.

FIG. 6 shows another special layer of material is found in a standard keyboard 3 located directly above the printed circuit sheet 21. FIG. 6 shows a typical key return mat 26. Small rubber spring return posts 27 function to return standard keys 2 to normal position after being depressed to produce a symbol in the computer memory and on the computer monitor 16. The same provision is added to the key return mat 26 for the added cursor activation keys 6. By experiments, the force required to depress the cursor activation keys 6 to provide the correct feedback to the fingers was between 0.03 and 1.5 newton. The optimum feedback force was found to be between 0.6 and 0.9 newton.

First Preferred Embodiment

The operational heart of this preferred embodiment is its laser, lens, camera-sensor, signal receiver, and signal transmitter. FIG. 7 provides a view of these components for the preferred embodiment. FIG. 7 is an exploded view of these components and shows lens 29 attached to a camera-sensor 30 and then both units are placed on a small PCB 13 located within the space bar 5. The center of the lens is directly under the small aperture in the space bar 5 with the 'sweet spot' (focal point) at a distance of 0.094 inches below the top surface of the space bar 5. The lens is as provided by AVAGO Technologies, ADNS-6150, or by a comparable supplier such as MOGO, or equal. Laser 10 & camera-sensor 30 is as provided by AVAGO Technologies, ADNS-7530, or equal. The three units together provide the ability to sense the movement of the operator's thumb and transpose that movement onto the computer monitor.

Cursor Port

Aperture 4 involves the location of a lens 10 fused or cast within the center of the keyboard 3 space bar 5. The horizontal surface of the lens 10 is positioned either 0.094 inches below the surface of the space bar 5, or flush with the space bar 5 surface surrounded by a raised boss to provide the 0.094 inch distance to hold the thumb 9 at this 'sweet spot' for movement of the cursor. A range of distances may be used depending upon the accuracy and cost required.

Cursor Activation Keys

The preferred embodiments involves the addition of new cursor activation keys 6 between the existing rows of keyboard 3 keys 2 for operation by the fingers of the operator's hands. The cursor activation keys 6 control right, left, scroll, rotate, zoom, etc. of the cursor on the computer monitor 16. The cursor activation keys 6 activate contact points on a printed circuit sheet 21 to produce the desired action of the selected cursor activation key 6.

Printed Circuit Sheet

The preferred embodiments of the printed circuit sheet 21 involves the addition of new contact points and leads to an existing printed circuit sheet 21, or to providing a new printed circuit sheet just for the new contact points. The new contact points provide the means for causing cursor action. For cursor location it is the left click function of locating the cursor on the computer monitor 16 as used by a standard mouse. Also for the right click function of pulling down a selection list. For scroll, a left click hold down while using the thumb 9 for up and down movement of the cursor. While holding left and right cursor activation keys 6 down, the thumb 9 is used to rotate or zoom an object on the computer monitor 16. As with the cursor activation keys 6, other activations keys for games can be added to the printed circuit sheet 21, or to a new sheet.

Key Return Mat

The preferred embodiments of the rubber key return mat 26 involves the addition of new spring return posts 27 to an existing key return mat 26. The spring return posts provide tactile feedback to the operator's fingers that the function has been completed. The feedback needs to be just sufficient to get the feeling without being tiresome to operate. By tests, the desired return force on the cursor activation keys 6 should be between 0.6 and 0.9 Newton. The amount of deflection of the cursor activation keys 6 is limited to about 0.01 to 0.02 inches. This is far less than the existing keys 2 on a keyboard 3 move. This allows the cursor activation keys 6 to be activated without causing normal keys to be activated at the same time.

Printed Circuit Board

The first preferred embodiment of the present invention includes printed circuit board 13 with a layout of laser 10, lens 29, and camera-sensor 30, all located within the space bar 5. The processor 11 and transmitter 12 are all placed within the existing keyboard 3. The circuitry for this has been demonstrated, and typical components selected have been shown to function as required.

Space Bar

The preferred embodiment of the present invention includes printed circuit board 13 with a layout of laser 10, lens 29, and camera-sensor 30, all located within the space bar 5. The lens optical 'sweet spot' can either be flush with the space key top surface, or provided by a short boss a very short distance above the space key top surface.

Wireless Dongle Receiver

The preferred embodiments for transferring the movements of the thumb 9 and action of the cursor activation keys 6 is through a wireless signal transmitter 12 to a wireless Dongle receiver 14 at a USB port on the computer processing unit (CPU 15). The Dongle receiver 14 circuits are arranged to collect the precise movements and transmit them to the cursor for full coverage of the monitor 16 screen. The Dongle 14 programming involves communication speed with the host/PC of 1.5 Mbit/s for a distance of 3 meters and at a frequency of 2.4 GHz to 2.5 GHz. Power accessed from the PC is about +5 V. While these parameters are optimum, other parameters can be used, such as combining the functions of the processor of a keyboard with the functions of a processor of a cursor into a single processor in the keyboard.

Electronic Circuit

The electronic circuits are arranged for applying power to a laser 10, taking pictures of the light spectrum on the side of the thumb 9, collecting and analyzing the changes in movement, and sending the results to the signal transmitter 12 circuit for wireless movement to the Dongle 14. The circuitry provides provisions for re-routing the controls from the right to the left thumb, controlling the speed and direction of cursor movement, and complete vertical and horizontal scrolling of the cursor. The scrolling does not use a rotating slotted wheel, light, and sensor as employed in a standard mouse. The scrolling circuitry uses programming logic to take the activation of two cursor activation keys 6 to initiate the cursor movement up, down, or back and forth. Pushing both keys activates Z movement.

Wireless Keyboard

Preferably the special components of the present invention are battery powered. Battery is preferred for power as it allows the invention to be added to a normal wireless keyboard 3 that already has battery power. This does not prevent using power from a standard USB connection between the keyboard 3 and the CPU 15.

The lens 29, camera-sensor 30, laser 10, and the PCB 13 with all circuits, are sized to be fitted inside the space bar 5. Other required circuits, processing chips, and where wireless operation is provided, a transmitter are easily located within the key board 3. Power to the PCB is supplied via the key board USB connection, or by any type of battery. The populated PCB 13 is inserted inside the existing space bar 5 of the key board 3.

Variations

The present invention has been described in detail with respect to specific embodiments Persons skilled in the computer keyboard art will recognize that many variations are possible within the general scope of the invention. For example additional special keys could be added which could be very useful if the keyboard is to be used for computer games, or to meet special programming needs. For laptop type computers which may be too thin to permit the location of the light source and the sensor in the spacebar, the light source and sensor may be located outside the spacebar and the light can be transmitted optically from the source to the aperture in the spacebar and imaging carrying light can be transmitted optically to the sensor from the aperture in the spacebar. An optical solution is shown in FIG. 8. Many keyboard designs other that the one described above could be modified for use with the present invention. Therefore, the scope of the present invention should be determined by the appended claims and not by the specific embodiment described above.

What is claimed is:

1. A keyboard with a thumb operated curser controller comprising:
    A) a spacebar having an aperture, smaller than a typical person's thumb, through at least a portion of the spacebar,
    B) a light source for illuminating the aperture from below the aperture,
    C) a sensor for making digital images of surfaces of user thumbs moving across said aperture at rates of at least 1,500 images per second with resolutions of at least 400 dpi from light reflected from said surfaces,
    D) a lens for focusing the light reflected from said thumbs onto said sensor,
    E) a computer processor programmed to control curser positions of a computer monitor, and
    F) a transmitter for transmitting said thumb images to a computer processor programmed to control curser positions based on changes in the thumb images wherein said user controls positions of said curser by moving his thumb across said aperture in said spacebar.

2. The keyboard as in claim 1 wherein the sensor and the light source are located inside the spacebar.

3. The keyboard as in claim 1 wherein said keyboard also comprises activation keys for causing curser functions of right, left, up, down, rotate, and zoom as used in computer assisted design (CAD) and other special program operations.

4. The keyboard as in claim 1 wherein said keyboard also comprises game keys adapted for playing computer games.

5. The keyboard as in claim 1 wherein said light source comprises an LED.

6. The keyboard as in claim 1 wherein said light source comprises a laser light source.

7. The keyboard as in claim 1 wherein the sensor and the light source are located outside the spacebar.

8. The keyboard as in claim 7 wherein said light source also comprises an optical conduit for transmitting light from said light source to said aperture and further comprising an optical conduit for optically transmitting image-carrying light reflected from the thumb to the sensor.

9. The keyboard as in claim 1 wherein said keyboard is adapted to permit a user's hands, including fingers and thumbs, to remain directly over the keys and space bar of a keyboard for maximum efficiency of computer operation while moving, selecting, and activating the cursor.

10. The keyboard as in claim 1 wherein said keyboard is adapted to permit operation of cursor with fingers or thumb of either right or left hand.

* * * * *

UNITED STATES PATENT AND TRADEMARK OFFICE
CERTIFICATE OF CORRECTION

PATENT NO. : 8,803,807 B2  
APPLICATION NO. : 13/507667  
DATED : August 12, 2014  
INVENTOR(S) : Clem Abrams et al.

Page 1 of 1

It is certified that error appears in the above-identified patent and that said Letters Patent is hereby corrected as shown below:

On The Title Page, item (76) inventors [Matin Dinca] should read -- Marin Dinca --.

Signed and Sealed this
Nineteenth Day of May, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,803,807 B2 | Page 1 of 1 |
| APPLICATION NO. | : 13/507667 | |
| DATED | : August 12, 2014 | |
| INVENTOR(S) | : Abrams et al. | |

It is certified that error appears in the above-identified patent and that said Letters Patent is hereby corrected as shown below:

Title Page,
Item [75], Inventors, "Marin Dinca" (as corrected to read in the Certificate of Correction issued May 19, 2015) is deleted and patent is returned to its original state with inventors name in patent to read -- Matin Dinca --.

Signed and Sealed this
Fourth Day of August, 2015

Michelle K. Lee
*Director of the United States Patent and Trademark Office*